United States Patent Office 2,914,591
Patented Nov. 24, 1959

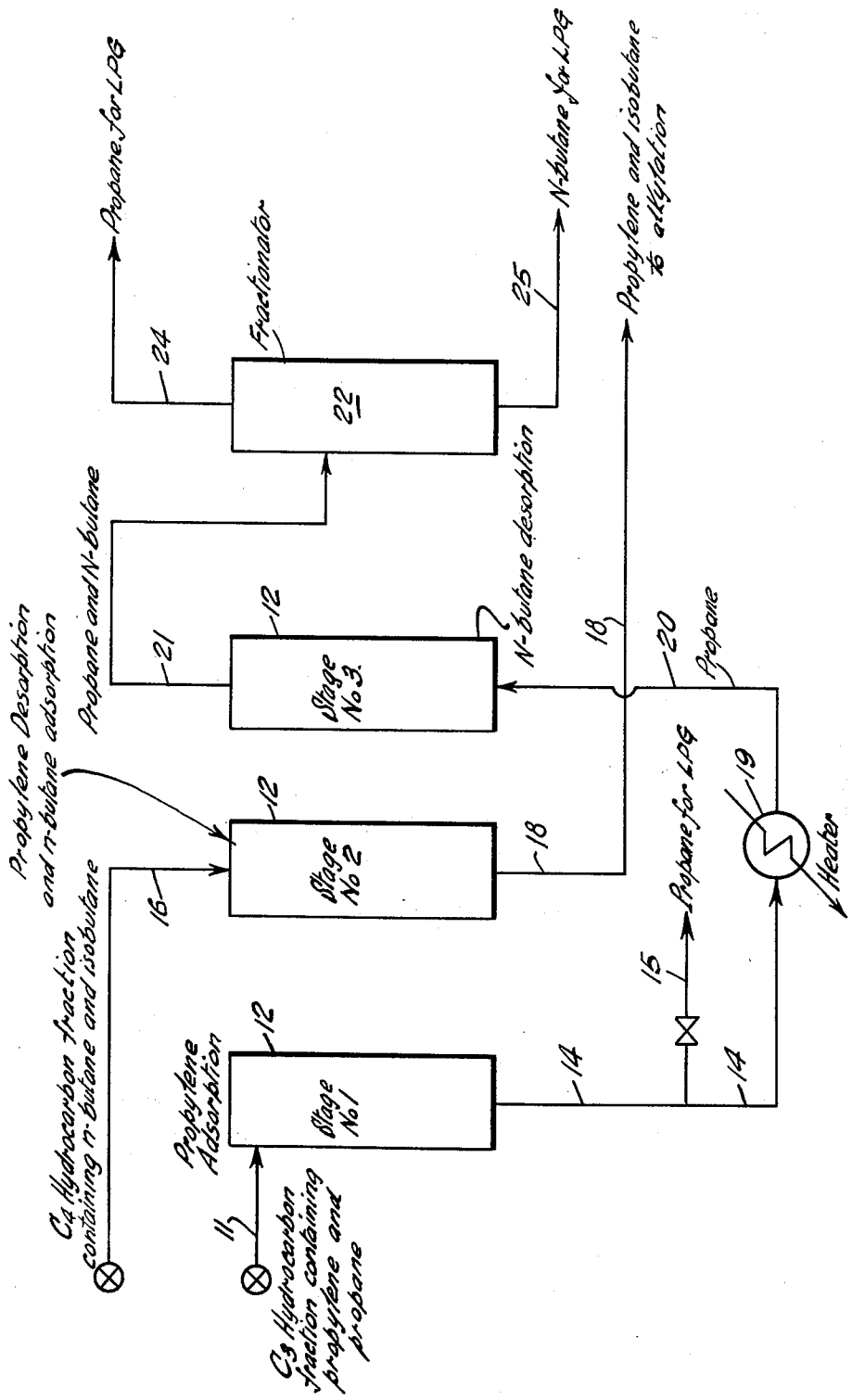

2,914,591

UPGRADING PETROLEUM REFINERY STREAMS

John D. Brown, New Rochelle, N.Y., assignor to Texaco Inc., a corporation of Delaware Application May 7, 1958, Serial No. 733,580

4 Claims. (Cl. 260—683.49)

This invention relates to a method of treating gaseous $C_3$ and $C_4$ hydrocarbon streams. More particularly, this invention relates to a method of upgrading petroleum refinery streams containing $C_3$ hydrocarbons, including propane and propylene, and $C_4$ hydrocarbons including n-butane and isobutane. In accordance with one specific embodiment the practice of this invention is directed to the manufacture of high octane motor fuel components or gasoline from petroleum refinery streams containing $C_3$ hydrocarbons and $C_4$ hydrocarbons.

It is an object of this invention to provide an improved method for the handling and processing of petroleum refinery streams containing $C_3$ hydrocarbons and $C_4$ hydrocarbons.

It is another object of this invention to provide a process for the manufacture of high octane alkylate from normally gaseous $C_3$ and $C_4$ hydrocarbons.

Still another object of this invention is to provide a method of treating separate streams of normally gaseous hydrocarbons, one stream a $C_3$ hydrocarbon stream containing propane and propylene, and another stream containing $C_4$ hydrocarbons including n-butane and isobutane, for the separation therefrom of an admixture of propylene and isobutane particularly suitable as a feed admixture to an alkylation reaction for the preparation of a high octane alkylate.

How these and other objects of this invention are accomplished will become apparent in the light of the accompanying disclosure and drawing which schematically illustrates a process flow in accordance with one embodiment of the practice of this invention.

In accordance with this invention a gaseous hydrocarbon stream containing propane and propylene is contacted with a selected adsorbent which selectively adsorbs straight chain hydrocarbons to the substantial exclusion of non-straight chain hydrocarbons and which selectively adsorbs propylene over propane in order to adsorb propylene from said gaseous hydrocarbon stream. Following the selective adsorption of propylene the adsorbent, now substantially saturated with respect to propylene, is contacted with a gaseous hydrocarbon stream containing n-butane and isobutane in order to effect desorption of the propylene from the adsorbent and substantially simultaneous adsorption of the n-butane. As a result of the desorption of propylene from the adsorbent together with the substantially concomitant adsorption of n-butane by the adsorbent there is recovered from this operation a gaseous effluent comprising propylene and isobutane. This gaseous effluent of propylene and isobutane is then supplied to an alkylation reaction zone for the preparation of the corresponding high octane propylene-isobutane alkylate. The n-butane now adsorbed in the selective adsorbent is desorbed therefrom by contact with a suitable gaseous desorbing medium, such as propane recovered from the aforesaid first selective adsorption operation wherein propylene was separated from propane. Following the desorption of n-butane the adsorbent is then returned to contact additional fresh gaseous $C_3$ hydrocarbon stream containing propane and propylene for the selective adsorption of propylene therefrom.

In the aforesaid combination of operations involving selective adsorption, desorption and alkylation any suitable alkylation reaction wherein a branched chain saturated hydrocarbon, such as isobutane, is reacted with or alkylated with an olefinic hydrocarbon, such as propylene, might be employed. With respect to the adsorbent employed to effect selective adsorption of propylene from propane and desorption of propylene therefrom by contact with n-butane, it is preferred in the practice of this invention to employ as the selective adsorbent a solid, alumino-silicate molecular sieve type adsorbent, i.e., an adsorbent which selectively adsorbs straight chain hydrocarbons to the substantial exclusion of non-straight chain hydrocarbons and which preferentially adsorbs straight chain unsaturated or olefinic hydrocarbons over straight chain saturated hydrocarbons.

Any suitable selective adsorption process effective for the removal of straight chain hydrocarbons from branched chain hydrocarbons and effective for the removal of straight chain olefinic hydrocarbons from straight chain saturated hydrocarbons is satisfactorily employed in the practice of this invention. Particularly applicable in the practice of this invention is a selective adsorbent comprising certain natural or synthetic zeolites or alumino-silicates, such as a calcium alumino-silicate, which exhibit the property of a molecular sieve, i.e., matter made up of porous crystals wherein the pores of the crystals are of molecular dimension and are of substantially uniform size. In general, zeolites may be described as water-containing alumino-silicates having a general formula $$(R,R'_2)O.Al_2O_3 nSiO_2.mH_2O$$

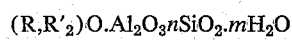

wherein R may be an alkaline earth metal and R' is an alkali metal such as sodium or potassium or lithium. These materials, when dehydrated for the removal of substantially all of the water therefrom, retain their crystalline structure and are particularly suitable as selective adsorbents in the practice of this invention.

An especially suitable solid adsorbent which selectively adsorbs straight chain hydrocarbons to the substantial exclusion of non-straight chain hydrocarbons and which selectively adsorbs straight chain olefinic hydrocarbons such as propylene, over straight chain saturated hydrocarbons such as propane, is a calcium alumino-silicate, apparently actually a sodium calcium alumino-silicate, manufactured by Linde Air Products Company and designated Linde Type 5A molecular sieve. The crystals of this particular calcium alumino-silicate have a pore size or opening of about 5 Angstrom units, a pore size sufficiently large to admit straight chain hydrocarbons such as the normal paraffins and normal olefins to the substantial exclusion of the non-straight chain hydrocarbons, i.e., naphthenic, aromatic, isoparaffinic and isoolefinic hydrocarbons. This particular selective adsorbent is available in various sizes, such as in the form of ⅛" or ⅟₁₆" diameter pellets, or as a finely divided powder having a particle size in the range of 0.5–5.0 microns. However, a selective adsorbent employed in the practice of this invention may be in any suitable form or shape, granular, spheroidal or microspheroidal.

Other suitable solid selective adsorbents which may be employed in the practice of this invention include the synthetic and natural zeolites which, when dehydrated, may be described as crystalline zeolites having a rigid three dimensional anionic network and having interstitial dimensions sufficiently large to permit the entry and adsorption of straight chain hydrocarbons but sufficiently small to exclude the non-straight chain hydrocarbons possessing a larger critical molecular dimension or cross section. The naturally occurring zeolite, chabazite, exhibits such desirable properties. Another suitable naturally occurring zeolite is analcite $NaSlSi_2O_6 \cdot H_2O$ which, when dehydrated and when all or a part of the sodium is replaced by an alkaline earth metal such as calcium, yields a material which may be represented by the formula $(Ca,Na_2)Al_2Si_4O_{12} \cdot 2H_2O$ and which after suitable conditioning will adsorb straight chain hydrocarbons to the substantial exclusion of non-straight chain hydrocarbons. Other naturally occurring or synthetically prepared zeolites such as phacolite, gmelinite, harmotome and the like or suitable base exchange modifications of these zeolites may be employed in the practice of this invention.

Other solid inorganic or mineral selective adsorbents which selectively adsorb straight chain hydrocarbons to the substantial exclusion of non-straight chain hydrocarbons and which preferentially adsorb straight chain olefinic hydrocarbons over straight chain saturated hydrocarbons are known. It is contemplated that selective adsorbents having the property of selectively adsorbing straight chain hydrocarbons to the substantial exclusion of non-straight chain hydrocarbons in the manner of a molecular sieve and in accordance with the requirements of a selective adsorbent suitable for use in the practice of this invention may be obtained by suitable treatment of various oxide gels, especially metal oxide gels of the polyvalent amphoteric metal oxides.

The adsorptive separation or the selective adsorption of propylene from a $C_3$ hydrocarbon stream containing propylene and propane is carried out at any desirable temperature below the critical temperature of propylene, below about 200° F., actually below 198° F. As indicated, the selective adsorption operation for the selective adsorption of propylene from propane is carried out in the gaseous phase. When the selective adsorption operation is carried out at a temperature below the critical temperature of propylene the capacity of the selective adsorbent employed for the particular component (propylene) to be separated, particularly when a molecular sieve type alumino-silicate is employed, is greater than when the selective adsorption operation is carried out at a temperature above the critical temperature of propylene. Following the selective adsorption operation there is recovered from the propylene adsorption operation a gaseous effluent comprising unadsorbed propane.

The propylene is then desorbed from the adsorbent by contact with a $C_4$ hydrocarbon stream containing n-butane and isobutane. The desorption of propylene from the adsorbent is carried out at a temperature above the critical temperature of propylene, above about 200° F., but desirably below the critical temperature of n-butane, below about 307° F. By carrying out the desorption of propylene in this manner not only is propylene desorbed but the n-butene replaces the propylene within the selective adsorbent. As a result of carrying out the desorption of propylene from the selective adsorbent in the foregoing manner there is produced a resulting desorption effluent comprising propylene and isobutane. This desorption effluent is then passed, in accordance with the practice of this invention, to an alkylation reaction zone for the manufacture of the corresponding propylene-isobutane alkylate.

Following the desorption of the propylene from the adsorbent together with the concomitant adsorption of n-butane the adsorbent is then contacted with a gaseous desorbing medium such as the gaseous propane recovered from the aforesaid propylene adsorption operation. This contacting operation is carried out at an elevated temperature such that the n-butane is desorbed from the adsorbent. A temperature suitable for effecting the desorption of n-butane from the adsorbent is a temperature above the critical temperature of n-butane, i.e., a temperature above about 307° F. As a result of the desorption of n-butane from the adsorbent in the foregoing manner the adsorbent is recovered therefrom with a relatively minor amount or substantially free of adsorbed straight chain hydrocarbons (propane and/or n-butane). The thus-treated and recovered adsorbent is then employed to contact additional $C_3$ hydrocarbon stream for the separation of propylene therefrom.

Alkylation processes which are suitably employed in the combination treating operations in accordance with this invention for the alkylation of mixtures comprising substantially only propylene and isobutane are well known in the art. Suitable alkylation processes, identified by the type of alkylation catalyst employed, include sulfuric acid alkylation processes as well as HF alkylation and aluminum chloride alkylation processes. In sulfuric acid, HF and aluminum chloride alkylation processes, a saturated branched chain hydrocarbon, such as isobutane, is contacted in the liquid phase at a suitable low temperature with an olefinic hydrocarbon such as propylene. In the alkylation reactor the olefinic hydrocarbon reacts with the branched chain saturated isomeric hydrocarbon to yield the corresponding alkylate, such as the corresponding propylene-isobutane alkylate. During the alkylation reaction it is desirable to maintain a relatively great excess of the saturated isomeric hydrocarbon (isobutane) therein, at least about 5:1, preferably at least 10:1, on a molar basis in order to drive the alkylation reaction toward completion in the direction of consumption of the olefinic hydrocarbon (propylene). There is recovered from the alkylation reactor an alkylation reaction effluent comprising unreacted saturated isomeric hydrocarbon (isobutane) and alkylate. Desirably the alkylation reaction effluent is fractionated into the above mentioned components, the alkylate being recovered as product and the unreacted saturated isomeric hydrocarbon returned to the alkylation reactor to contact additional olefinic hydrocarbon therein. For a more comprehensive description of suitable alkylation processes see the Oil and Gas Journal, March 25, 1957, pages 153–165, the disclosures of which are herein incorporated and made a part of this disclosure.

Referring now to the drawing which schematically illustrates an embodiment of the practice of this invention a gaseous $C_3$ hydrocarbon stream such as a $C_3$ petroleum refinery stream containing propane and propylene is supplied from a suitable source via line 11 into adsorber 12 wherein it contacts a suitable molecular sieve type alumino-silicate adsorbent which selectively adsorbs straight chain hydrocarbons to the substantial exclusion of non-straight chain hydrocarbons and which selectively adsorbs straight chain olefinic hydrocarbons over straight chain paraffinic hydrocarbons, e.g. Linde Type 5A molecular sieve. The contacting operation is carried out at any suitable temperature below the critical temperature of propylene (198° F.), the temperature and pressure conditions during the adsorption operation being adjusted to maintain the $C_3$ hydrocarbon stream undergoing treatment in the gaseous phase. There is recovered from adsorber 12 via line 14 a treated effluent substantially free of propylene or having a reduced amount of propylene as compared with the $C_3$ hydrocarbon mixture supplied via line 11 to adsorber 12. A portion of the propane in the treated effluent in line 14 may be removed via line 15 for the manufacture of liquefied petroleum gas (LPG). The remaining portion in line 14 is employed in the manner described hereinafter in accordance with this invention. The aforesaid operation of selective adsorption of propylene from a $C_3$ hydrocarbon stream containing propane and propylene is indicated in the accompanying drawing as being stage No. 1 of the invention.

Subsequently, when the adsorbent within adsorber 12 is substantially saturated with propylene the adsorbent therein is contacted with a gaseous $C_4$ hydrocarbon stream containing n-butane and isobutane. As indicated in the drawing the gaseous $C_4$ hydrocarbon stream from a suitable source, not shown, is illustrated entering adsorber 12 via line 16. By contacting the selective adsorbent which is substantially saturated with propylene at a temperature above the critical temperature of propylene but below the critical temperature of normal butane (307° F.) the n-butane displaces and desorbs the adsorbed propylene from the adsorbent and is itself adsorbed by the adsorbent within adsorber 12. As a result of the foregoing operation, indicated in the accompanying drawing as being stage No. 2 of a process in accordance with this invention, there is recovered from adsorber 12 via line 18 a treated gaseous desorption effluent comprising the resulting desorbed propylene and isobutane. This treated desorption effluent comprising propylene and isobutane is then sent to a suitable alkylation reaction zone for the manufacture of the corresponding propylene-isobutane alkylate as indicated in the drawing.

Following stage No. 2 wherein propylene is desorbed from the adsorbent and replaced with n-butane with the resulting production of a feed mixture particularly suitable for use in an alkylation reaction, the n-butane, now adsorbed by the adsorbent within adsorber 12 is desorbed therefrom by contact with propane recovered from adsorber 12 during the stage No. 1 operation via line 14. Accordingly, in carrying out stage No. 3 of the process in accordance with this invention the treated effluent issuing from adsorber 12 via line 14 after having been brought to a suitable elevated temperature, desirably a temperature above the critical temperature of normal butane, by passage through heater 19 is supplied via line 20 into adsorber 12 to effect the desorption of n-butane from the adsorbent therein. By carrying out stage No. 3 of the practice of this invention at a temperature substantially above the critical temperature of n-butane there is recovered from adsorber 12 via line 21 a desorption effluent comprising propane and n-butane, the adsorbent within adsorber 12 having been substantially completely stripped or desorbed of the previously adsorbed n-butane. The desorption effluent recovered from adsorber 12 during the stage No. 3 operation via line 31 is introduced into fractionator 22 wherein it is fractionated into its various components, propane being recovered overhead via line 24 and n-butane being recovered as the bottoms fraction via line 25. Following completion of the stage No. 3 in a process in accordance with this invention the adsorbent is now in condition to be contacted with additional $C_3$ hydrocarbon mixture containing propane and propylene for the separation of propylene therefrom and for again carrying out stage No. 1 operation.

Although the practice of this invention has been illustrated in the accompanying drawing as involving only one adsorber 12, the adsorbent being shown in various stages of operation for reasons of clarity and understanding, a plurality of adsorbers, such as three or more, may be suitably employed in the practice of this invention so that the invention can be practiced substantially continuously. The disposition, location and means necessary for carrying out the practice of this invention on a substantially continuous basis by employing a plurality of adsorbers is well within the skill of those skilled in the art.

Further, no illustration in the accompanying schematic drawing has been made of conventional operating equipment such as control instruments, heat exchangers, pumps, flow regulating devices, etc. in order not to clutter up the drawing. The employment of such devices in accordance with the practice of this invention will be readily apparent to those skilled in the art. Also, it is evident from the foregoing disclosure that many modifications, substitutions and alterations are possible in the practice of this invention without departing from the spirit or scope thereof.

I claim:

1. A method of upgrading $C_3$ and $C_4$ hydrocarbon streams which comprises contacting a gaseous $C_3$ hydrocarbon stream containing propane and propylene with an alumino-silicate solid selective adsorbent which selectively adsorbs straight chain hydrocarbons to the substantial exclusion of non-straight chain hydrocarbons and which selectively adsorbs propylene over propane to adsorb propylene from said $C_3$ stream, desorbing the adsorbed propylene from said adsorbent by contact with a gaseous $C_4$ hydrocarbon stream containing n-butane and isobutane under conditions such that n-butane in said $C_4$ petroleum refinery stream displaces the previously adsorbed propylene and is adsorbed by said selective adsorbent and passing the resulting gaseous desorption effluent comprising isobutane and propylene to an alkylation reaction zone for the manufacture of the corresponding propylene-isobutane alkylate.

2. A method of upgrading gaseous $C_3$ and $C_4$ hydrocarbon streams which comprises contacting a $C_3$ hydrocarbon stream containing propane and propylene with an alumino-silicate molecular sieve adsorbent which adsorbs straight chain hydrocarbons to the substantial exclusion of non-straight chain hydrocarbons and which preferentially adsorbs propylene over propane to adsorb propylene from said $C_3$ hydrocarbon stream, recovering the remaining $C_3$ hydrocarbon stream containing propane and a substantially reduced amount of propylene, desorbing the adsorbed propylene from said adsorbent by contacting said adsorbent with a gaseous $C_4$ hydrocarbon stream containing n-butane and isobutane under conditions such that the n-butane is adsorbed by said adsorbent and the previously adsorbed propylene desorbed therefrom to yield a resulting gaseous desorption effluent comprising propylene and isobutane, passing said gaseous desorption effluent to an alkylation reaction zone for the preparation of the corresponding propylene-isobutane alkylate, desorbing the adsorbed n-butane from said adsorbent by contacting said adsorbent at an elevated temperature with said remaining $C_3$ hydrocarbon stream containing propane under conditions such that the n-butane is desorbed from said adsorbent and returning the resulting adsorbent to contact additional $C_3$ hydrocarbon stream for the removal of propylene therefrom.

3. A method of upgrading gaseous $C_3$ and $C_4$ hydrocarbon streams which comprises contacting a $C_3$ hydrocarbon stream containing propane and propylene with an alumino-silicate molecular sieve adsorbent which adsorbs straight chain hydrocarbons to the substantial exclusion of non-straight chain hydrocarbons and which preferentially adsorbs propylene over propane to adsorb propylene from said $C_3$ hydrocarbon stream, recovering the remaining $C_3$ hydrocarbon stream containing propane, desorbing the adsorbed propylene from said adsorbent by contacting said adsorbent with a gaseous $C_4$ hydrocarbon stream containing n-butane and isobutane under conditions such that the n-butane is adsorbed by said adsorbent and the previously adsorbed propylene desorbed therefrom to yield a resulting gaseous desorption effluent comprising propylene and isobutane, passing said gaseous desorption effluent to an alkylation reaction zone for the preparation of the corresponding propylene-isobutane alkylate, desorbing the adsorbed n-butane from said adsorbent by contacting said adsorbent at an elevated temperature above the critical temperature of n-butane with said remaining $C_3$ hydrocarbon stream containing propane, returning the resulting adsorbent to contact additional $C_3$ hydrocarbon stream for the removal of propylene therefrom and passing the resulting desorption effluent from the aforesaid n-butane desorption operation, said desorption effluent containing propane and n-butane, to a fractionation zone to separate propane and n-butane therefrom.

4. A method of upgrading gaseous $C_3$ and $C_4$ hydrocarbon streams which comprises contacting a $C_3$ hydrocarbon stream containing propane and propylene with an alumino-silicate molecular sieve adsorbent which adsorbs straight chain hydrocarbons to the substantial exclusion of non-straight chain hydrocarbons and which preferentially adsorbs propylene over propane to adsorb propylene from said $C_3$ hydrocarbon stream, recovering the remaining $C_3$ hydrocarbon stream containing propane and a reduced amount of propylene with respect to the aforesaid $C_3$ hydrocarbon stream, desorbing the adsorbed propylene from said adsorbent by contacting said adsorbent with a gaseous $C_4$ hydrocarbon stream containing n-butane and isobutane under conditions such that n-butane is adsorbed by said adsorbent and the previously adsorbed propylene desorbed therefrom to yield a resulting gaseous desorption effluent comprising propylene and isobutane, passing said gaseous desorption effluent to an alkylation reaction zone for the preparation of the corresponding propylene-isobutane alkylate, desorbing the adsorbed n-butane from said adsorbent by contacting said adsorbent at an elevated temperature with propane under conditions such that n-butane is desorbed from said adsorbent and substantially no propane is adsorbed therein and returning the resulting adsorbent, now substantially free of adsorbed straight chain hydrocarbons, to contact additional $C_3$ hydrocarbon stream for the removal of propylene therefrom.

References Cited in the file of this patent

UNITED STATES PATENTS

| | | |
|---|---|---|
| 2,351,609 | Haensel | June 20, 1944 |
| 2,378,216 | Haensel et al. | June 12, 1945 |
| 2,818,455 | Ballard et al. | Dec. 31, 1957 |

OTHER REFERENCES

Chemical and Engineering News, vol. 32, p. 4786, November 1954.

Disclaimer 2,914,591.—*John D. Brown*, New Rochelle, N.Y. UPGRADING PETROLEUM REFINERY STREAMS. Patent dated Nov. 24, 1959. Disclaimer filed Aug. 30, 1962, by the assignee, *Texaco Inc.*

Hereby enters this disclaimer to claim 1 of said patent.

[*Official Gazette October 16, 1962.*]